(12) United States Patent
Tsuda

(10) Patent No.: US 7,953,533 B2
(45) Date of Patent: May 31, 2011

(54) VEHICLE CONTROL APPARATUS

(75) Inventor: Kohei Tsuda, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 610 days.

(21) Appl. No.: 12/153,816

(22) Filed: May 23, 2008

(65) Prior Publication Data

US 2009/0074590 A1 Mar. 19, 2009

(30) Foreign Application Priority Data

Sep. 19, 2007 (JP) ................................ 2007-242825

(51) Int. Cl.
*F04B 41/06* (2006.01)
*F04B 49/10* (2006.01)

(52) U.S. Cl. .......................... 701/51; 180/65.275; 417/7

(58) Field of Classification Search ................ 701/1, 22, 701/51, 53, 67, 69, 95; 417/3, 5, 6, 7, 22, 417/32; 477/3, 7, 15, 37, 38, 50; 180/65.21–65.285, 180/305, 306, 307

See application file for complete search history.

(56) References Cited

U.S. PATENT DOCUMENTS

| | | | | |
|---|---|---|---|---|
| 6,703,807 | B2 * | 3/2004 | Sakata et al. .................. | 318/700 |
| 6,799,109 | B2 * | 9/2004 | Nakamori et al. .............. | 701/54 |
| 2003/0148850 | A1 | 8/2003 | Tomohiro et al. | |
| 2004/0029677 | A1 | 2/2004 | Mori et al. | |
| 2005/0170929 | A1 | 8/2005 | Ito et al. | |

FOREIGN PATENT DOCUMENTS

| | | |
|---|---|---|
| JP | A 2000-230442 | 8/2000 |
| JP | A 2002-130450 | 5/2002 |
| JP | A 2002-155865 | 5/2002 |
| JP | A-2003-172444 | 6/2003 |
| JP | A 2003-294124 | 10/2003 |
| JP | A 2005-207305 | 8/2005 |
| JP | A 2004-068732 | 3/2006 |
| JP | A 2006-152868 | 6/2006 |
| JP | A 2006-161853 | 6/2006 |
| JP | A 2007-186154 | 7/2007 |
| JP | A 2007-196954 | 8/2007 |

* cited by examiner

*Primary Examiner* — Richard M. Camby
(74) *Attorney, Agent, or Firm* — Oliff & Berridge, PLC

(57) ABSTRACT

A vehicle control apparatus includes an input member; a driving force transmission mechanism that transmits a rotational driving force of the input member to an output member; a mechanical pump that operates by using the rotational driving force of the input member; an electric pump that operates when a rotational speed of the mechanical pump is less than a predetermined operation threshold; an oil pressure control apparatus that performs control operations for the driving force transmission mechanism by supplying operating oil, which is supplied from the mechanical pump and the electric pump, to the driving force transmission mechanism; and a controller that detects a state of the electric pump.

22 Claims, 9 Drawing Sheets

| TEMPERATURE OF ELECTRIC MOTOR(°C) | STATE OF ELECTRIC PUMP |
|---|---|
| 0~140 | NORMAL |
| 140~160 | LEV 1 |
| 160 OR MORE | LEV 2 |

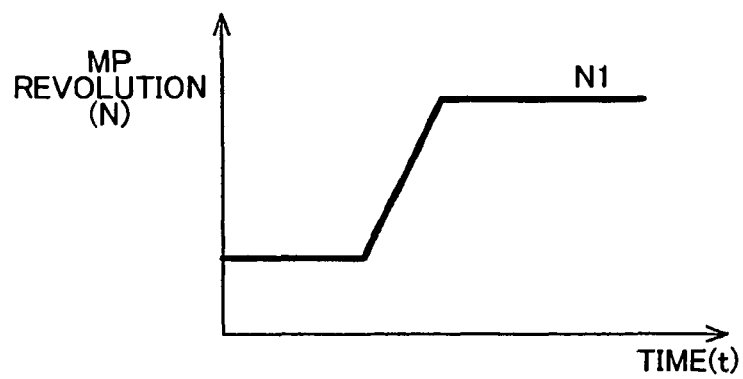
F I G. 13A
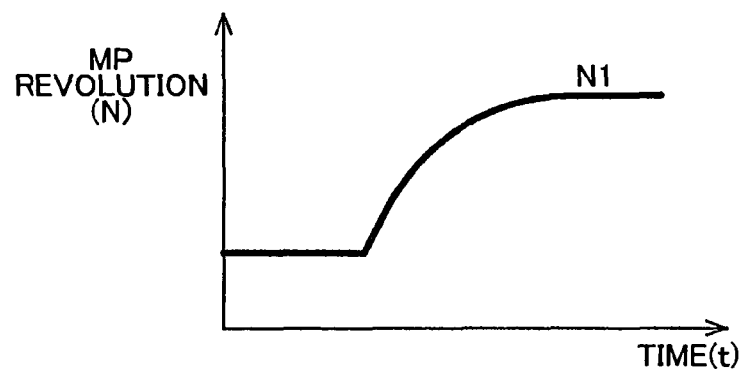
F I G. 13B
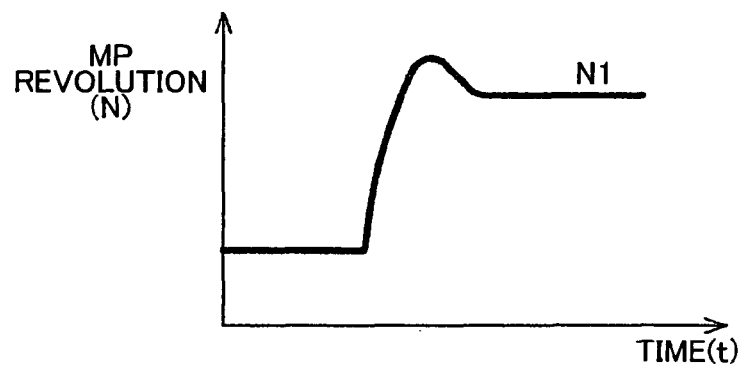
F I G. 13C
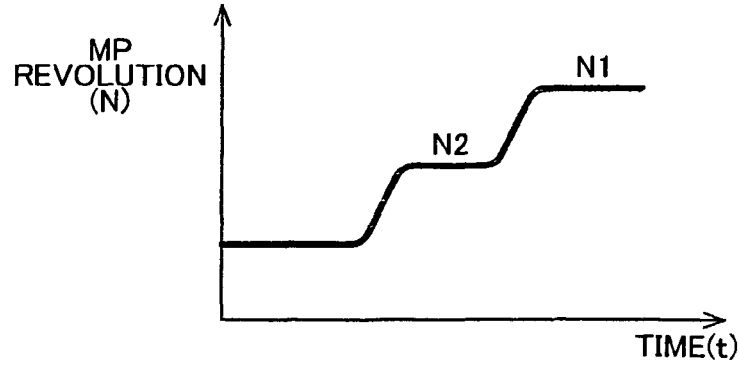
F I G. 13D

FIG. 14A

|  | WEIGHTING VALUE | | |
|---|---|---|---|
|  | LEV 0 | LEV 1 | LEV 2 |
| ELECTRIC MOTOR TEMPERATURE | 1.5 | 3 | 5 |
| VOLTAGE / OIL TEMPERATURE | 0.5 | 1 | 2 |
| INTEGRAL VALUE | 1 | 2 | 4 |

FIG. 14B

|  | ELECTRIC MOTOR TEMPERATURE | VOLTAGE / OIL TEMPERATURE | INTEGRAL VALUE | SUM TOTAL |
|---|---|---|---|---|
| A | 1.5 | 0.5 | 1 | 3 |
| B | 0 | 1 | 0 | 1 |
| C | 3 | 0 | 2 | 5 |
| D | 1.5 | 0.5 | 0 | 2 |
| ⋮ | ⋮ | ⋮ | ⋮ | ⋮ |

VEHICLE CONTROL APPARATUS

CROSS-REFERENCE TO RELATED APPLICATION

The disclosure of Japanese Patent Application No. 2007-242825 filed on Sep. 19, 2007 including the specification, drawings and abstract is incorporated herein by reference in its entirety.

BACKGROUND

The present invention relates to a vehicle control apparatus.

There exists a vehicle control apparatus, as shown in Japanese Patent Application Publication No. 2003-172444, which includes an engine and a motor generator (5 and 6 in FIG. 2 in Japanese Patent Application Publication No. 2003-172444) as a driving source. The driving control apparatus described in Japanese Patent Application Publication No. 2003-172444 is configured such that, when the engine revolution becomes a predetermined revolution or less, an electric oil pump (11 in FIG. 2 in Japanese Patent Application Publication No. 2003-172444) is driven, and the pressurized oil from the electric oil pump is supplied to an oil pressure control apparatus (9 in FIG. 2 in Japanese Patent Application Publication No. 2003-172444), which permits the engagement of a clutch (C1 in FIG. 3 in Japanese Patent Application Publication No. 2003-172444) of an automatic transmission mechanism (8 in FIG. 2 in Japanese Patent Application Publication No. 2003-172444).

SUMMARY

The driving control apparatus described in Japanese Patent Application Publication No. 2003-172444 is configured such that, when the driving conditions of the electric oil pump are not satisfied, the flow of the operating oil, which is supplied from a mechanical oil pump (10 in FIG. 2 in Japanese Patent Application Publication No. 2003-172444) and the electric oil pump to the oil pressure control apparatus, is reduced, which further reduces the clutch oil pressure from a predetermined oil pressure down to zero (atmospheric pressure) (see FIG. 6(b) and Paragraph [0114] in Japanese Patent Application Publication No. 2003-172444). With such an arrangement, when engaging the clutch of the automatic transmission mechanism in such a state in which the flow of the operating oil to be supplied to the oil pressure control apparatus has been reduced, in some cases, insufficient pressure of the operating oil supplied to the oil control apparatus leads to a malfunction in the clutch engagement such as a delay in the clutch engagement, engagement shock, etc. Such a malfunction in the clutch engagement is a factor that damages the automatic transmission mechanism, as well as a factor that causes the driver to feel discomfort.

In order to prevent a malfunction of the clutch engagement from occurring as described above, the driving control apparatus described in Japanese Patent Application Publication No. 2003-172444 is configured such that, after the engine restart conditions have been satisfied, the revolution of the motor generator is increased so as to rotate the mechanical oil pump, which increases the pressure of the operating oil supplied to the oil pressure control apparatus. Subsequently, with the oil pressure control apparatus, the clutch of the automatic transmission mechanism is engaged (see FIG. 6(b) and Paragraphs [0115] through [0118] in Japanese Patent Application Publication No. 2003-172444). This requires a certain period of time to increase the pressure of the operating oil supplied to the oil pressure control apparatus up to the oil pressure that corresponds to the idling revolution, from the oil pressure in a state in which the driving conditions of the electric oil pump are not satisfied. This leads to a delay in the timing of shifting of the automatic transmission, which is a factor that causes the driver to feel discomfort.

Furthermore, the driving control apparatus described in Japanese Patent Application Publication No. 2003-172444 is configured such that, when the driving conditions of the electric oil pump are not satisfied due to factors which affect the driving conditions of the electric oil pump, such as when the oil temperature of ATF detected by an oil temperature detection unit (13b in FIG. 2 in Japanese Patent Application Publication No. 2003-172444) is outside an available temperature range, etc., the electric oil pump is stopped. With such an arrangement, the electric oil pump is not stopped until such a factor that affects the driving conditions of the electric oil pump comes to be outside the driving conditions of the electric oil pump. Accordingly, in order to protect the electric oil pump, to prevent it from breaking down, and to improve the life of the electric oil pump, there is still room for improvement in such a driving control apparatus with respect to a function of maintaining the electric oil pump within the driving conditions.

The present invention thus provides a vehicle control apparatus having a function of preventing a malfunction of an electric pump and devices connected to the electric pump, which is capable of rapidly operating a driving transmission mechanism by an oil pressure control apparatus while preventing the occurrence of operation malfunctions such as delay in the operation of the driving transmission mechanism, operation shock, etc.

According to a first exemplary aspect, a vehicle control apparatus includes an input member; a driving force transmission mechanism that transmits a rotational driving force of the input member to an output member; a mechanical pump that operates by using the rotational driving force of the input member; an electric pump that operates when a rotational speed of the mechanical pump is less than a predetermined operation threshold; an oil pressure control apparatus that performs control operations for the driving force transmission mechanism by supplying operating oil, which is supplied from the mechanical pump and the electric pump, to the driving force transmission mechanism; and a controller that detects a state of the electric pump. If the controller determines that a predetermined protection condition, which has been defined with respect to a factor that affects durability of the electric pump, has been satisfied during an operation of the electric pump, the rotational speed of the mechanical pump is increased to the operation threshold or more and the operation of the electric pump is sequentially stopped.

BRIEF DESCRIPTION OF THE DRAWINGS

Various exemplary aspects of the invention will be described with reference to the drawings, wherein:

FIGS. 13A-13D are diagrams for describing the driving state of a mechanical pump according to another embodiment; and FIGS. 14A-14B are tables which show an example of weighing values and evaluation results based upon the weighing values according to another embodiment.

DETAILED DESCRIPTION OF EMBODIMENTS

[Overall Configuration of Driving Apparatus]

Figure 1:
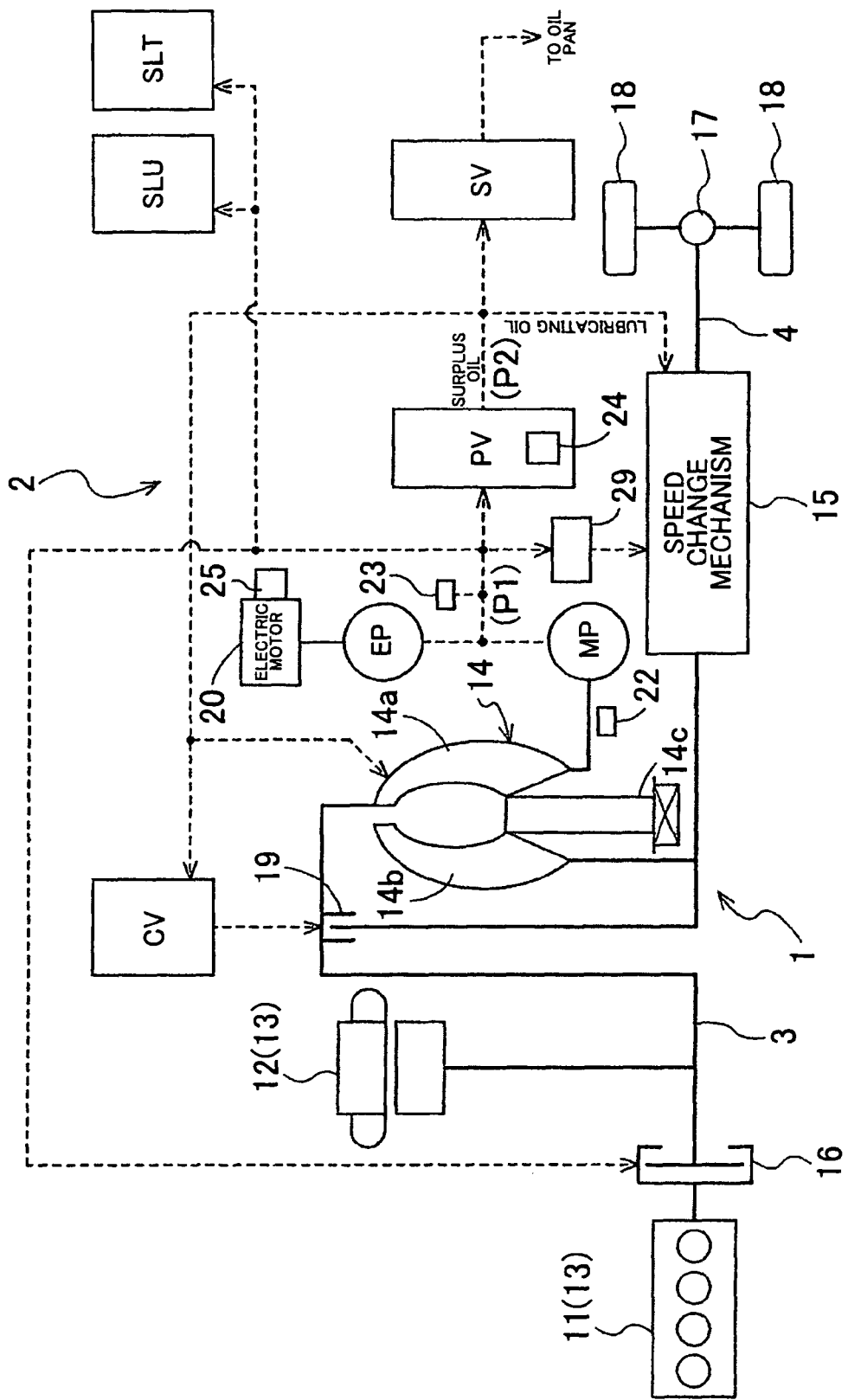
FIG. 1 is a schematic diagram that shows the schematic configurations of a driving apparatus and an oil pressure control apparatus.

Description will be made below regarding a vehicle including a vehicle control apparatus according to the present invention. As an example, description will be made in the present embodiment regarding an arrangement in which a vehicle control apparatus according to the present invention is applied to a hybrid vehicle. First, a description will be made regarding a schematic configuration of a driving apparatus 1 with reference to FIG. 1. FIG. 1 is a schematic diagram that shows a schematic configuration of the driving apparatus I and an oil pressure control apparatus 2. It should be noted that the solid lines indicate the transmission paths of the driving force, and the dotted lines indicate supply paths of operating oil.

As shown in FIG. 1, the driving apparatus 1 includes a driving source 13 for vehicle driving including an engine 11 and a rotating electrical machine 12. The engine 11 is connected to an input member 3 through a transmission clutch 16. Furthermore, the rotating electrical machine 12 is connected to the input member 3. With such an arrangement, the engine 11 and the rotating electrical machine 12 are connected to each other in series via the transmission clutch 16, which provides the driving apparatus 1 with a parallel-type hybrid vehicle configuration.

The rotating electrical machine 12 is electrically connected to a capacitor device (not shown) such as a battery capacitor. The rotating electrical machine 12 is configured such that, when the rotating electrical machine 12 receives electric power, it serves as a motor which generates power, and when the rotating electrical machine 12 receives power, it serves as a generator which generates electric power. The transmission clutch 16, which has a function of engaging/disengaging the transmission of the power from the engine 11, is provided between the engine 11 and the rotating electrical machine 12. The transmission clutch 16 operates using the supply of the operating oil at a line pressure P1 described later, under the control of an oil pressure control valve (not shown).

With the driving apparatus 1, when the vehicle is started or is driven at a low speed, the transmission clutch 16 is disengaged, and the engine 11 is stopped. In this state, only the driving force of the rotating electrical machine 12 is transmitted to a wheel 18, thereby driving the vehicle. Then, the rotating electrical machine 12 receives the supply of the electric power from the capacitor device (not shown) to generate the driving force. Subsequently, when the rotational speed of the rotating electrical machine 12 (i.e., the driving speed of the vehicle) reaches a predetermined speed or more, the transmission clutch 16 is engaged, which cranks the engine 11, thereby starting the engine 11. After the engine 11 is started, both the rotational driving forces of both the engine 11 and the rotating electrical machine 12 are transmitted to the wheel 18, thereby driving the vehicle. In this state, the rotating electrical machine 12 serves as either a generator which generates electric power by the driving force of the engine 11, or as a motor which generates driving force by electric power supplied from the capacitor device, depending on the charging state of the capacitor device. On the other hand, when the vehicle is decelerated, the transmission clutch 16 is disengaged, and the engine 11 is stopped. In this state, the rotating electrical machine 12 enters the state for generating electric power by the rotational driving force transmitted from the wheel 18. The electric power generated by the rotating electrical machine 12 is stored in the capacitor device. When the vehicle is stationary, both the engine 11 and the rotating electrical machine 12 are stopped, and the transmission clutch 16 is disengaged.

Furthermore, a torque converter 14 is provided to a downstream side of the transmission path of the driving source 13. The torque converter 14 has a configuration including: a pump impeller 14a which is connected to the input member 3 such that it serves as an input-side rotating member; a turbine runner 14b which is connected to a speed change mechanism 15 such that it serves as an output-side rotating member; and a stator 14c which includes a one-way clutch, and which is provided between the pump impeller 14a and the turbine runner 14b. The interior of the torque converter 14 is filled with the operating oil, through the medium of which the torque converter 14 transmits the driving force between the pump impeller 14a on the driving side and the turbine runner 14b on the driven side.

The torque converter 14 includes a lockup clutch 19. When the lockup clutch 19 is engaged, the driving force of the driving source 13 is directly transmitted to the speed change mechanism 15 without involving the operating oil. As described later, the operating oil at an adjusted pressure P2 is supplied to the torque converter 14 including the lockup clutch 19.

When the speed is shifted in the speed change mechanism 15, the lockup clutch 19 is disengaged, thereby transmitting the driving force via the operating oil. On the other hand, when the vehicle starts, the lockup clutch 19 is kept engaged, thereby starting the vehicle by the driving force of the rotating electrical machine 12. With such an arrangement, when the vehicle starts, the lockup clutch 19 is engaged, thereby suppressing slippage of the torque converter 14. Such an arrangement improves the starting/acceleration performance of the vehicle. Furthermore, such an arrangement suppresses the generation of heat in the operating oil stored in the torque converter 14, thereby improving the energy efficiency.

Furthermore, the speed change mechanism 15 is connected to the downstream side of the transmission path of the torque converter 14. The speed change mechanism 15 allows the rotational driving force transmitted from the driving source 13 via the torque converter 14 to be transmitted to the wheel 18 side at a predetermined transmission gear ratio. The speed change mechanism 15 is configured with a multi-stage automatic transmission, including friction engagement elements such as clutches, brakes, etc., each of which has a function of switching a rotational component of a gear mechanism between engagement and disengagement, thereby providing the transmission gear ratio of each speed shift. Each of the friction engagement elements included in the speed change mechanism 15 operates by receiving the supply of the operating oil at the line pressure P1 described later under the control of a transmission control oil pressure control valve 29. It should be noted that the speed change mechanism 15 may have a continuously variable automatic transmission configuration. With such an arrangement, the operating oil at the line pressure P1 is supplied so as to operate each pulley on the driving side and driven side in the continuously variable automatic transmission, thereby performing the shifting operation of the non-stage automatic transmission.

An output member 4 is connected to the downstream side of the transmission path of the speed change mechanism 15. Furthermore, the wheels 18 are connected to the output member 4 through a differential device 17. With such an arrangement, the rotational driving force transmitted from the driving source 13 to the input member 3 is shifted by the speed change mechanism 15 to be transmitted to the output member 4. The rotational driving force transmitted to the output member 4 is transmitted to the wheels 18 via the differential device 17.

[Configuration of Oil Pressure Control Apparatus]

Figure 2:
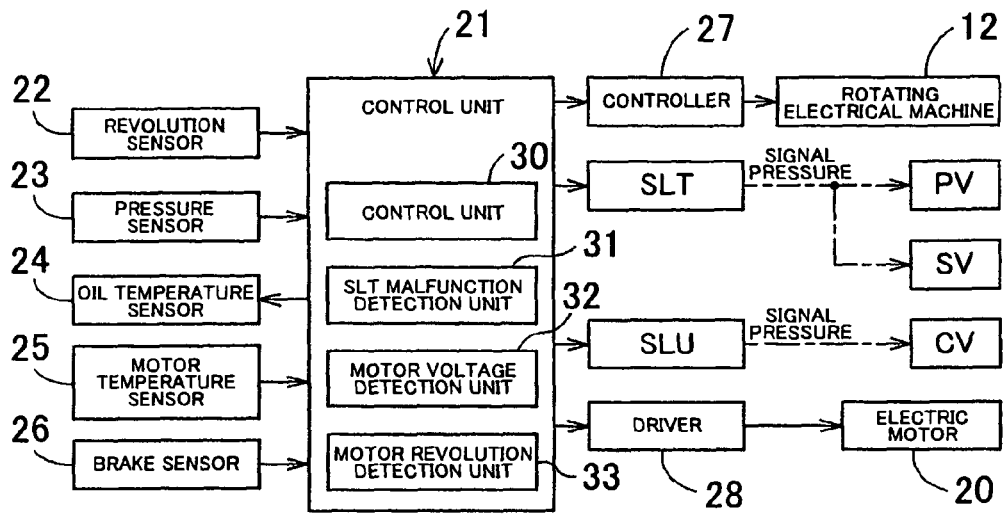
FIG. 2 is a block diagram that shows a control system included in a vehicle control apparatus.

Description will be made regarding the configuration of an oil pressure control apparatus 2 with reference to FIG. 1 and FIG. 2. FIG. 2 is a block diagram that shows a control system in the vehicle control apparatus. It should be noted that, in FIG. 2, the alternate long and short dashed lines indicate the supply paths for the signal pressure. As shown in FIG. 1, the oil pressure control apparatus 2 has a configuration including two kinds of pumps, i.e., a mechanical pump MP and an electric pump EP, each of which serves as an oil pressure source for supplying the pressurized oil to each unit of the driving apparatus 1. The mechanical pump MU is an oil pump that operates by using the driving force of the driving source 13. In the present embodiment, the mechanical pump MP is connected to the pump impeller 14a of the torque converter 14. With such an arrangement, the mechanical pump MP is driven by the rotational driving force of the rotating electrical machine 12 or both of the rotational driving forces of the engine 11 and the rotating electrical machine 12.

As shown in FIG. 1 and FIG. 2, the electric pump EP is an oil pump which operates by using the driving force of an electric motor 20 without involving the driving force of the driving source 13. The electric pump EP is an auxiliary pump that assists the mechanical pump MP. The electric pump EP operates in the state in which the mechanical pump MP cannot supply the required flow of the operating oil, when the vehicle is driven at a low speed; when the vehicle is stationary; etc.

The oil pressure control apparatus 2 has a configuration including a first adjustment valve (primary regulator valve) PV and a second adjustment valve (secondary regulator valve) SV, each of which serves as a pressure adjustment valve for adjusting the pressure of the operating oil supplied from the mechanical pump MP and the electric pump EP to a predetermined pressure.

The first adjustment valve PV is a pressure adjustment valve that adjusts the pressure of the operating oil supplied from the mechanical pump MP and the electric pump EP to a predetermined line pressure P1. Specifically, the first adjustment valve PV adjusts the line pressure P1 (which is the reference oil pressure for the driving apparatus 1) according to a predetermined signal pressure supplied from a linear solenoid valve SLT. The second adjustment valve SV is a pressure adjustment valve which adjusts the oil pressure of a surplus oil from the first adjustment valve PV to a predetermined adjusted pressure P2. Specifically, the second adjustment valve SV adjusts the surplus oil that is discharged from the first adjustment valve PV to the adjusted pressure P2 while draining a part of the oil to an oil pan.

The linear solenoid valve SLT receives the supply of the operating oil adjusted to the line pressure P1 by the first adjustment valve PV. Furthermore, the linear solenoid valve SLT adjusts the opening of the valve according to a control command value (which will be referred to as the "SLT command value" hereinafter) output from the control unit 21, thereby supplying the operating oil to the first adjustment valve PV and the second adjustment valve SV at a predetermined signal pressure according to the SLT command value.

The operating oil adjusted to the line pressure P1 by the first adjustment valve PV is supplied to each friction engagement element, the transmission clutch 16, etc., each of which is a clutch, brake, etc., included in the speed change mechanism 15. Furthermore, the operating oil adjusted to the adjustment pressure P2 by the second adjustment valve SV is supplied to a lubricating oil path of the speed change mechanism 15, the torque converter 14, a lockup control valve CV for controlling the lockup clutch 19, etc.

The lockup control valve CV is an operation control valve that allows the lockup clutch 19 to be switched between engagement and disengagement. Specifically, the lockup control valve CV receives the supply of the operating oil adjusted to the adjusted pressure P2 by the second adjustment valve SV. Furthermore, the lockup adjustment valve CV opens/closes according to a predetermined signal pressure from the lockup-controlling linear solenoid valve SLU, which supplies the operating oil, adjusted to the adjusted pressure P2 by the second adjustment valve SV, to the oil-pressure chamber of the lockup clutch 19, thereby controlling the operation of the lockup clutch 19 between engagement and disengagement.

[Block Diagram Showing a Control System of the Vehicle Control Apparatus]

Description will be made regarding a block diagram showing the control system of the vehicle control apparatus with reference to FIG. 1 and FIG. 2. As shown in FIG. 1 and FIG. 2, the vehicle includes a revolution sensor 22, a pressure sensor 23, an oil temperature sensor 24, and a motor temperature sensor 25.

The revolution sensor 22 is provided to the input section of the mechanical pump MP, which serves as a revolution detection unit, and can detect the revolution of the input section of the mechanical pump MP. It should be noted that the revolution sensor 22 may be disposed at a different position as long as it can detect the revolution of the mechanical pump MP. Specifically, the revolution sensor 22 may be provided to a different transmission path (e.g., the input member 3) on an upstream side of the input section of the mechanical pump MP.

Furthermore, the pressure sensor 23 is connected as a pressure detection unit (state detection mechanism) to a merging oil path merging an oil path connected to the outlet of the mechanical pump MP and an oil path connected to the outlet of the electric pump EP. The pressure sensor 23 detects the pressure of the operating oil supplied from the mechanical pump MP and the electric pump EP. It should be noted that the pressure sensor 23 may be connected at a different position. For example, the pressure sensor 23 may be connected to any of the oil paths connected to the outlet of the mechanical pump MP, the oil path connected to the outlet of the electric pump EP, and the oil path inside the first adjustment valve PV.

Furthermore, the oil temperature sensor 24 is connected to the inside of the first adjustment valve PV, which serves as an oil temperature detection unit (state detection mechanism). The oil temperature sensor 24 detects the oil temperature of the operating oil discharged from the mechanical pump MP and the electric pump EP (e.g., when only the electric pump EP operates, the operating oil discharged from the electric pump EP is detected). It should be noted that the oil temperature sensor 24 may be connected at a different position. For example, the oil temperature sensor 24 may be connected to any of the oil path connected to the outlet of the electric pump EP, the inside of the electric pump EP, and the outlet of the electric pump EP. The electric motor 20 includes the motor temperature sensor 25 that serves as a temperature detection unit (state detection mechanism) for detecting the temperature of the electric motor 20. The motor temperature sensor 25 detects the temperature of the electric motor 20 (e.g., the surface temperature of the electric motor 20).

The revolution sensor 22, the pressure sensor 23, the oil temperature sensor 24, and the motor temperature sensor 25 are connected to a control unit 21. The control unit 21 processes the detection results acquired by these detector devices, and the detection results thus processed are output from the control unit 21, thereby allowing the vehicle control apparatus to perform the control operation as described later. Furthermore, a brake sensor 26 is connected to a brake pedal (not shown) of the vehicle, which detects the degree to which the brake pedal is depressed. The brake sensor 26 is connected to the control unit 21.

Furthermore, the rotating electrical machine 12 is connected to the control unit 21 through a controller 27, which allows the rotational speed, etc. of the rotating electrical machine 12, to be adjusted according to an output signal from the control unit 21. In order to increase the revolution N of the mechanical pump MP, the rotational speed of the rotating electrical machine 12 is increased due to the output from the control unit 21 to the controller 27.

Furthermore, the linear solenoid valve SLT and the lockup-controlling linear solenoid valve SLU are connected to the control unit 21. The SLT command value, which is a control signal for the linear solenoid valve SLT, is determined by the control unit 21 based upon various kinds of vehicle information such as the driving load, the opening of the accelerator, and then, is output to the linear solenoid valve SLT. The linear solenoid valve SLU, of which valve opening is adjusted according to the control command value output from the control unit 21, outputs the operating oil to the lockup control valve CV at a predetermined signal pressure according to the control command value.

Furthermore, the electric motor 20, which serves as an electric motor which drives the electric pump EP, is connected to the control unit 21 through a driver 28. The driver 28 is electrically connected to a capacitor device. With such an arrangement, when electric power is supplied to the electric motor 20 from the capacitor device according to an output signal output from the control unit 21 to the driver 28, the electric pump EP is driven. On the other hand, when the supply of the electric power from the capacitor device to the electric motor 20 is blocked according to the output from the control unit 21 to the driver 28, the electric pump EP is stopped.

The control unit 21 includes: a control unit 30; a linear solenoid valve malfunction detection unit 31 which serves as a malfunction detection unit for detecting malfunctions of the linear solenoid valve SLT (which will be referred to as the "SLT malfunction detection unit 31" hereinafter); a motor voltage detection unit 32 which serves as a voltage detection unit (state detection mechanism) for detecting the driving voltage of the electric motor 20; and a motor revolution detection unit 33 which serves as a revolution detection unit (state detection mechanism) for detecting the revolution of the electric motor 20.

For example, when the output current value from the control unit 21 to the linear solenoid valve SLT is greater than a normal value, the SLT malfunction detection unit 31 detects a malfunction of the linear solenoid valve SLT. It should be noted that an arrangement may be made including a linear solenoid valve malfunction detection unit for detecting malfunctions of the linear solenoid valve SLU (SLU malfunction detection unit (not shown)), which serves as a malfunction detection unit. Based upon the output value from the control unit 21 to the driver 28 connected to the electric motor 20, the motor voltage detection unit 32 detects the driving voltage of the electric motor 20 that drives the electric pump EP. The motor revolution detection unit 33 detects the revolution of the electric motor 20 that drives the electric pump EP according to the output value from the control unit 21 to the driver 28 connected to the electric motor 20.

[Content of the Control Operation by the Vehicle Control Apparatus]

Figure 3:
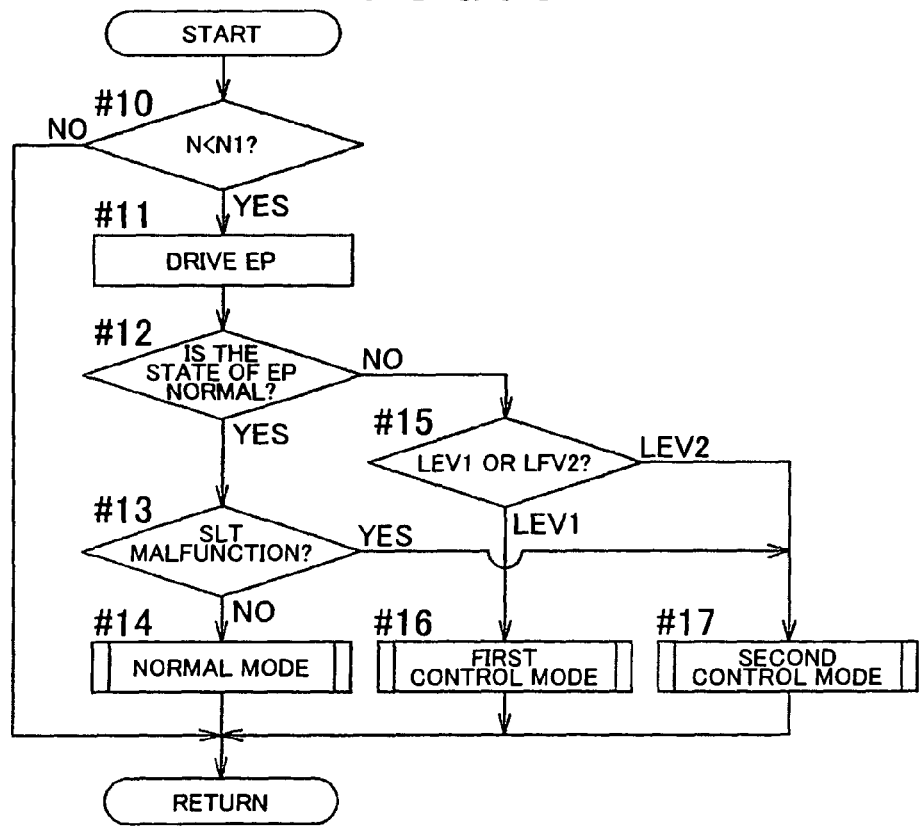
FIG. 3 is a flowchart that shows a main routine for the control operation performed by the vehicle control apparatus.
Figures 4, 5:
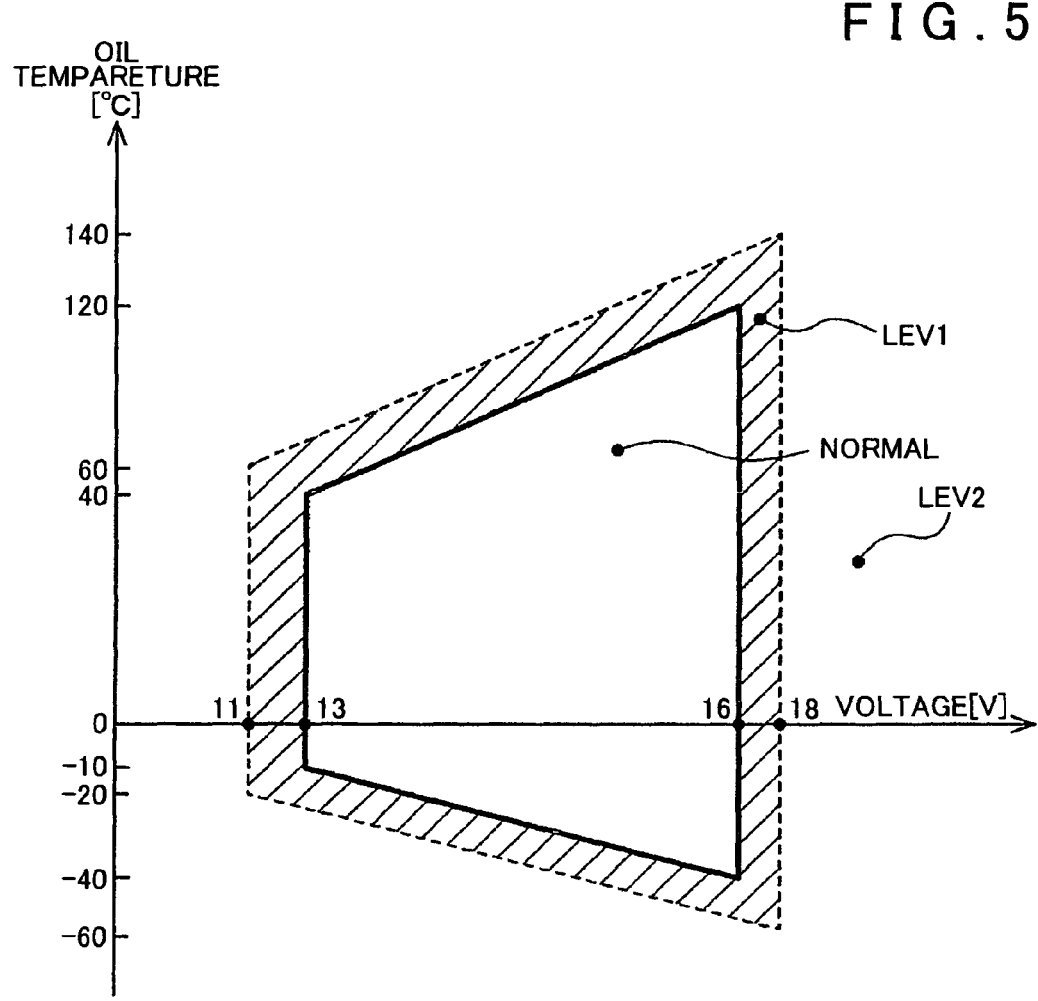
FIG. 4 is a table that shows a specific example in which the protection condition and the stop condition are checked with respect to the electric pump based upon the temperature of an electric motor.
FIG. 5 is a diagram that shows a specific example in which the protection condition and the stop condition are checked with respect to the electric pump based upon the relation between the driving voltage of the electric motor and the oil temperature.
Figure 6:
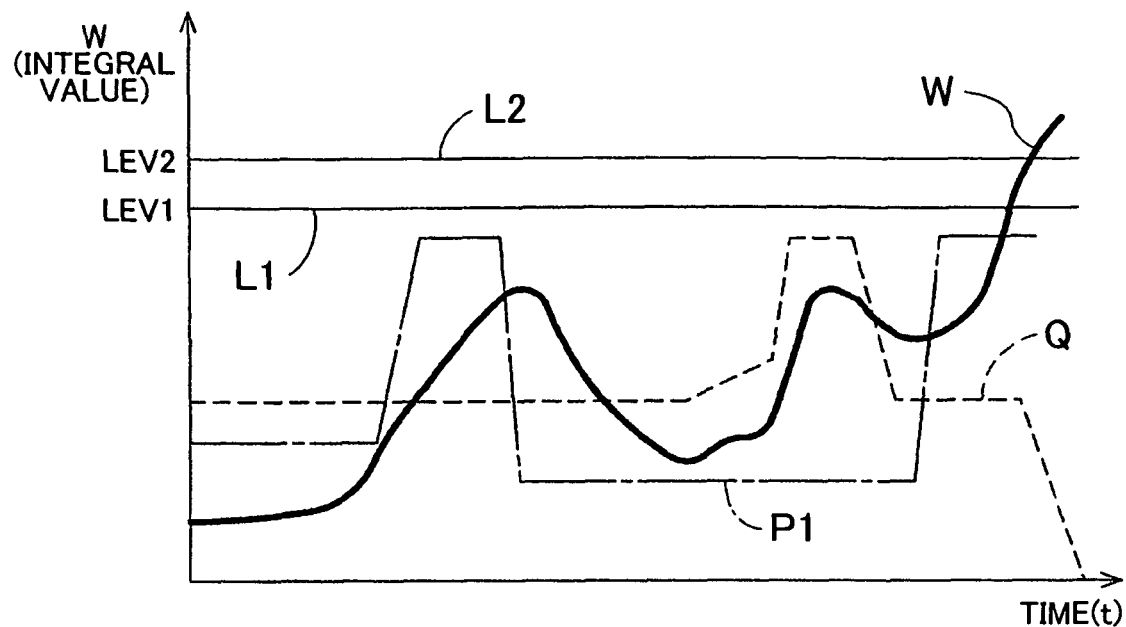
FIG. 6 is a diagram which shows a specific example in which the protection condition and the stop condition are checked with respect to the electric pump based upon the integral value W of the product of the discharge amount of the electric pump and a line pressure.

Description will be made with reference to FIG. 3 through FIG. 6 regarding the content of the control operation performed by the vehicle control apparatus. FIG. 3 is a flowchart that shows the main routine of the control operation performed by the vehicle control apparatus. FIG. 4 through FIG. 6 show a table and diagrams, which show a specific example in which the protection condition and the stop condition are checked with respect to the electric pump EP. Specifically, FIG. 4 shows a specific example in which the protection condition and the stop condition are checked with respect to the electric pump EP based upon the temperature of the electric motor 20. FIG. 5 is a diagram which shows a specific example in which the protection condition and the stop condition are checked with respect to the electric pump EP based upon the relation between the driving voltage of the electric motor 20 and the oil temperature. FIG. 6 is a diagram which shows a specific example in which the protection condition and the stop condition are checked with respect to the electric pump EP based upon the integral value W of the product of the discharge amount Q of the electric pump EP and the line pressure P1. Note that the alternately long and short dashed line shown in FIG. 6 indicates the change in the line pressure P1 detected by the pressure sensor 23 at respective times. The dotted line shown in FIG. 6 indicates the change in the discharge amount Q of the electric pump EP at respective times, which is computed based upon the revolution of the electric motor 20 that is detected by the motor revolution detection unit 33. The solid line shown in FIG. 6 indicates the change in the integral value W obtained by time integrating the product of the line pressure P1, indicated by the alternate long and short dashed line shown in FIG. 6, and the discharge amount Q of the electric pump EP, indicated by the dotted line shown in FIG. 6.

As shown in FIG. 3, in the control unit 21, the input signal from the revolution sensor 22 is monitored. With such an arrangement, determination is made whether or not the revolution N of the mechanical pump MP is less than a predetermined revolution N1 (Step #10). If determination has been made that the revolution N of the mechanical pump MP is less than a predetermined revolution N1 ("YES" in Step #10), the control unit 21 outputs a signal to the driver 28 so as to drive the electric motor EP (Step #11). It should be noted that the predetermined revolution N1 corresponds to the revolution of the mechanical pump MP in the state in which the engine 11 operates at an idling revolution (e.g., 600 rpm).

If the electric pump EP is driven, a determination is made whether or not the state of the electric pump EP is "normal" based upon the detection results from the motor temperature sensor 25, the oil temperature sensor 24, and the pressure sensor 23, each of which is connected to the control unit 21, and the motor voltage detection unit 32 and the motor revolution detection unit 33 each of which is included in the control unit 21 (Step #12).

Description will be made below with reference to FIG. 4 and FIG. 5 regarding a specific example in which the protection condition and the stop condition are checked with respect to the electric pump EP. Note that, in the following description, a state within the predetermined safe operation region before the state defined by the protection condition for the electric pump EP, i.e., the state of the electric pump EP which can irreversibly degrade the durability of the electric pump EP, will be referred to as "LEV1." On the other hand, the state defined by the stop condition for the electric pump EP, i.e., the state where the electric pump EP is within a predetermined dangerous region in which the durability of the electric pump EP can be irreversibly degraded, will be referred to as "LEV2."

Now, as an example, specific description will be made regarding the "LEV2" state of the electric pump EP. For example, in an arrangement employing a three-phase AC motor as the electric motor 20 which drives the electric pump EP, the state in which deterioration in the electric insulation of the coil in the AC motor or deterioration in the performance of a magnet in the AC motor leads to influence on the output characteristics of the AC motor in its subsequent operation, is defined as a state of the electric pump EP in "LEV2" (the state which can irreversibly degrade the durability of the electric pump EP). While description has been made in this specific example regarding an arrangement employing an AC motor, the same can be said for an arrangement employing a DC motor.

As shown in FIG. 4, when the temperature of the electric motor 20 detected by the motor temperature sensor 25 is less than 140° C., determination is made that the state of the electric pump EP (temperature of the electric motor 20) is "normal." When the temperature of the electric motor 20 detected by the motor temperature sensor 25 is equal to or greater than 140° C. and is less than 160° C., determination is made that the state of the electric pump EP (temperature of the electric motor 20) is "LEV1." When the temperature of the electric motor 20 detected by the motor temperature sensor 25 is equal to or greater than 160° C., determination is made that the state of the electric pump EP (temperature of the electric motor 20) is "LEV2."

In FIG. 5, on the coordinates with the driving voltage (V) set to the horizontal axis, and with the oil temperature (° C.) set to the vertical axis, a relation between the driving voltage of the electric motor 20 detected by the motor voltage detection unit 32 and the oil temperature detected by the oil temperature sensor 24 is plotted. When the plotted point is within the region surrounded by the solid line in FIG. 5, determination is made that the state of the electric pump EP is "normal." When the plotted point is within a hatched region, which is outside the region surrounded by the solid line and within the region surrounded by the dotted line in FIG. 5, determination is made that the state of the electric pump EP is "LEV1." When the plotted point is outside the region surrounded by the dotted line in FIG. 5, determination is made that the state of the electric pump EP is "LEV2."

As shown in the graph in FIG. 6, the thresholds L1 and L2 are set with respect to the integral value W (indicated by the solid line in FIG. 6) obtained by time integrating the product of the discharge amount Q of the electric pump EP (indicated by the dotted line in FIG. 6) and the line pressure P1 (indicated by the alternate long and short dashed line in FIG. 6). It should be noted that the integral value W corresponds to the load state of the electric pump EP. When the integral value W computed based upon the line pressure P1 detected by the pressure sensor 23 and the revolution of the electric motor 20 detected by the motor revolution detection unit 33 is less than the threshold L1, determination is made that the state of the electric pump EP is "normal." When the integral value W is equal to or greater than L1, and is less than L2, determination is made that the state of the electric pump EP is "LEV1." When the integral value W is greater than L2, determination is made that the state of the electric pump EP is "LEV2."

With such an arrangement, the increase in the line pressure P1 increases the integral value W even if the discharge amount Q of the electric pump EP does not change over time. Conversely, the increase in the discharge amount Q of the electric pump EP increases the integral value W even if the line pressure P1 does not change over time. Thus, the state of the electric pump EP is determined based upon the integral value W of the product of the discharge amount Q of the electric pump EP and the line pressure P1. Thus, such an arrangement allows the state of the electric pump EP to be determined even if it is difficult to determine the state of the electric pump EP based upon only either the discharge amount Q of the electric pump EP or the line pressure P1.

As shown in FIG. 3, if determination is made that all the aforementioned conditions, i.e., the temperature of the electric motor 20, the relation between the driving voltage of the electric motor 20 and the oil temperature, and the integral value W, are "normal" ("YES" in Step #12), determination is made whether or not there is any malfunction with respect to the linear solenoid valve SLT based upon the detection results from the SLT malfunction detection unit 31 (Step #13). If determination is made that there is no malfunction with respect to the linear solenoid valve SLT ("NO" in Step #13), the mode transits to a normal mode described later. On the other hand, if determination is made that there is a malfunction with respect to the linear solenoid valve SLT ("YES" in Step #13), the mode transits to a second control mode described later.

If determination has been made that at least one of the aforementioned conditions, i.e., the temperature of the electric motor 20, the relation between the driving voltage of the electric motor 20 and the oil temperature, and the integral value W, is not "normal" ("NO" in Step #12), if determination has been made that at least one of these conditions, i.e., the temperature of the electric motor 20, the relation between the driving voltage of the electric motor 20 and the oil temperature, and the integral value W, is "LEV1," and if determination has been made that none of the conditions, i.e., the temperature of the electric motor 20, the relation between the driving voltage of the electric motor 20 and the oil temperature, and the integral value W, is "LEV2" ("LEV1" in Step #15), the mode transits to a first control mode described later (Step #16).

If determination has been made that at least one of the aforementioned conditions, i.e., the temperature of the electric motor 20, the relation between the driving voltage of the electric motor 20 and the oil temperature, and the integral value W, is not "normal" ("NO" in Step #12), and if determination has been made that at least one of the aforementioned conditions, i.e., the temperature of the electric motor 20, the relation between the driving voltage of the electric motor 20 and the oil temperature, and the integral value W, is "LEV2" ("LEV2" in Step #15), the mode transits to the second control mode described later (Step #17).

[Specific Content of the Control Operation Performed by the Vehicle Control Apparatus in each Mode]

Figure 7:
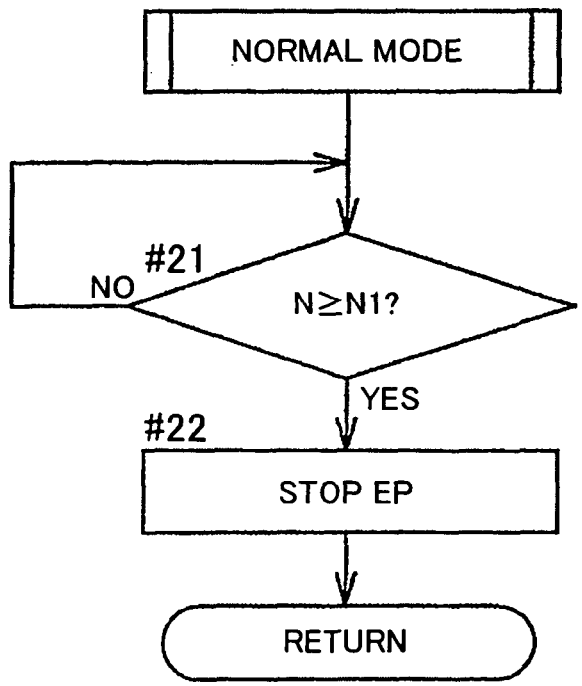
FIG. 7 is a flowchart that shows a subroutine when the mode transits to a normal mode.
Figure 8:
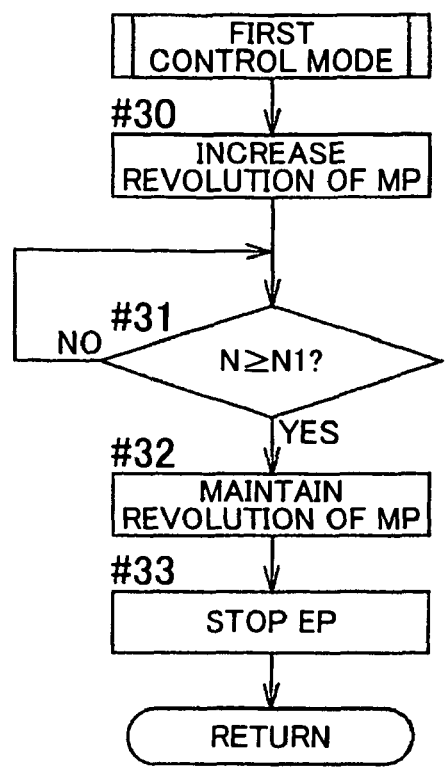
FIG. 8 is a flowchart that shows a subroutine when the mode transits to a first control mode.
Figure 9:
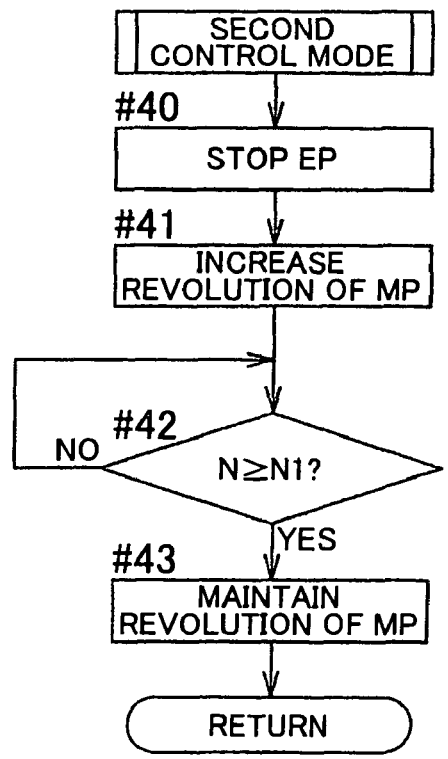
FIG. 9 is a flowchart that shows a subroutine when the mode transits to a second control mode.
Figure 10:
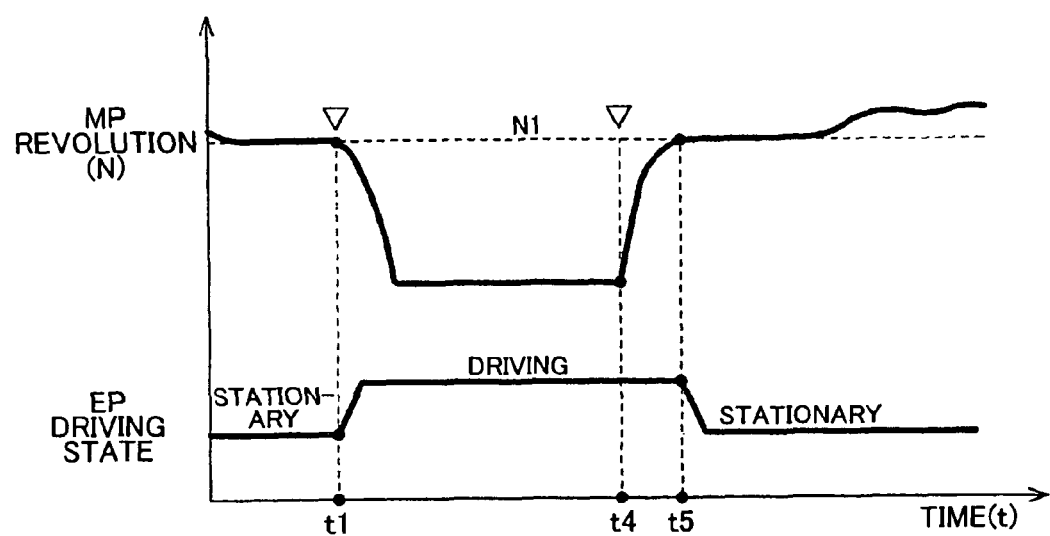
FIG. 10 is a time chart for describing the driving state of the electric motor in the normal mode.
Figure 11:
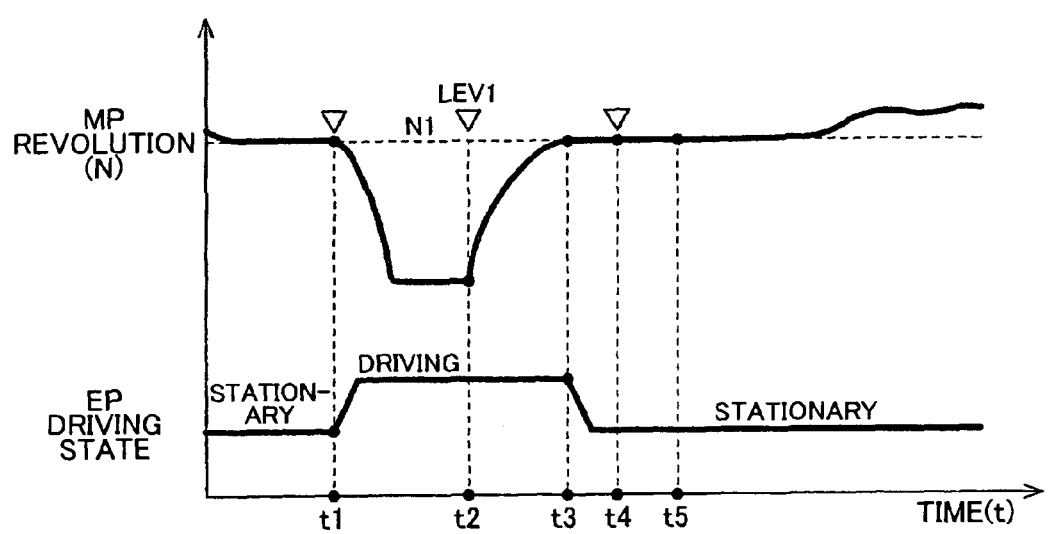
FIG. 11 is a time chart for describing the driving state of the electric motor in the first control mode.
Figure 12:
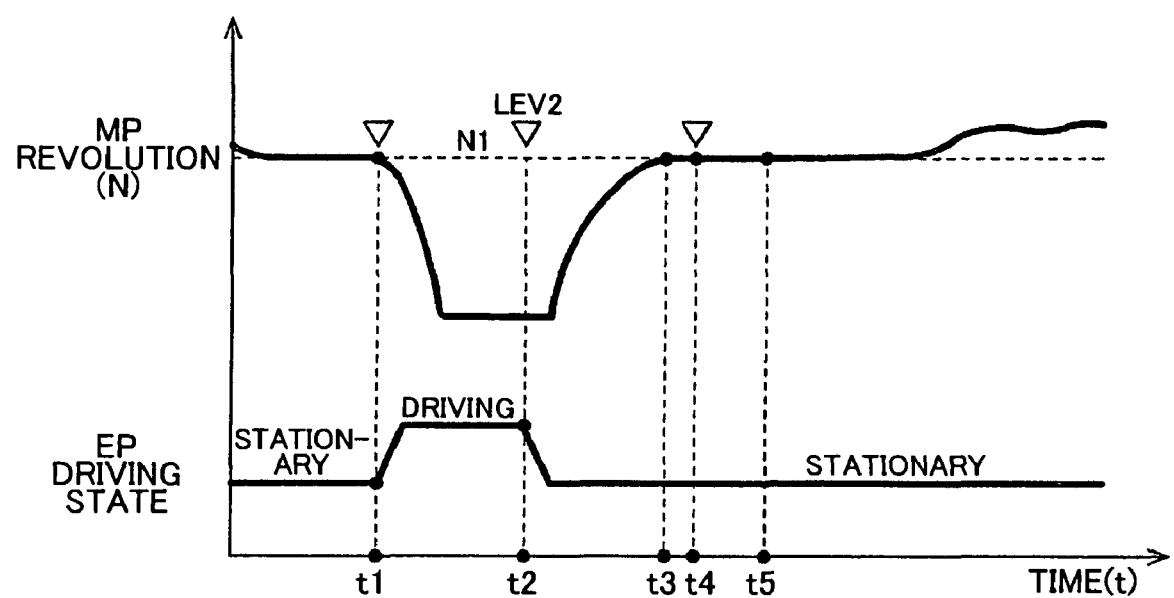
FIG. 12 is a time chart for describing the driving state of the electric motor in the second control mode.

Description will be made with reference to FIG. 7 through FIG. 12 regarding the specific content of the control operation in each of the normal mode, the first control mode, and the second control mode. FIG. 7 through FIG. 9 are flowcharts showing subroutines after the mode transition to the normal mode, the first control mode, and the second control mode. FIG. 10 through FIG. 12 are time charts for describing the driving state etc. of the electric pump EP, in each of the normal mode, the first control mode, and the second control mode. Note that description will be made with reference to FIG. 7 through FIG. 12 regarding an example in which the vehicle control apparatus performs the control operation when the vehicle is stationary, the same can be said for while the vehicle is being driven at a low speed, etc.

As shown in FIG. 7, when the mode transits to the normal mode, determination is made whether or not the revolution N of the mechanical pump MP has reached a predetermined revolution N1 or more (Step #21) based upon an input signal from the revolution sensor 22. When determination has been made that the revolution N1 of the mechanical pump MP has reached the predetermined revolution N1 or more ("YES" in Step #21), the control unit 21 outputs an instruction to the driver 28 so as to stop the electric pump EP which was being driven in Step #11 (Step #22). If the revolution N of the mechanical pump MP is less than the predetermined revolution N1 ("NO" in Step #21), the electric pump EP is maintained in the driving state.

As shown in FIG. 10, when the driver decelerates or stops the vehicle by depressing the brake pedal or the like, the revolution N of the mechanical pump MN is reduced. When the revolution N of the mechanical pump MP becomes smaller than the predetermined revolution N1 (t1 in FIG. 10), the electric pump EP is driven. On the other hand, when the driver accelerates the vehicle by releasing the depression of the brake pedal (t4 in FIG. 10) and so on, the revolution N of the mechanical pump MP increases. When the revolution N of the mechanical pump MP becomes equal to or greater than the predetermined revolution N1, the electric pump EP is stopped (t5 in FIG. 10). Then, the vehicle is accelerated by the power from the rotating electrical machine 12, following which the engine is started. With such an arrangement, in the state in which the revolution N of the mechanical pump MP is low, i.e., in the state in which the flow of the operating oil supplied from the mechanical pump MP is small, when the vehicle is stationary or the like, the electric pump EP is driven so as to increase the flow of the operating oil, thereby securing the flow of the operating oil to be supplied to the oil pressure control apparatus 2.

As shown in FIG. 8, when the mode transits to the first control mode, the control unit 21 outputs an instruction to the controller 27 so as to start to increase the revolution N of the mechanical pump MP while maintaining the predetermined revolution of the rotating electrical machine 12 (Step #30). Next, determination is made whether or not the revolution N of the mechanical pump MP has increased to the predetermined revolution N1 or more (Step #31). If determination has been made that the revolution N of the mechanical pump MP has increased to the predetermined revolution N1 or more ("YES" in Step #31), the increased revolution N of the mechanical pump MP is maintained (Step #32), and the control unit 21 outputs an instruction to the driver 28 so as to stop the electric pump EP (Step #33).

As shown in FIG. 11, when the driver decelerates or stops the vehicle by depressing the brake pedal, or the like, the revolution N of the mechanical pump MP is reduced. When the revolution N of the mechanical pump MP becomes smaller than the predetermined revolution N1 (t1 in FIG. 11), the electric pump EP is driven. If, in the state in which the electric pump EP is being driven, determination has been made that the state of the electric pump EP is "LEV1" (t2 in FIG. 11), the revolution N of the mechanical pump MP gradually increases in the form of a smooth curve. After the revolution N of the mechanical pump MP reaches the predetermined revolution N1 or more, the electric pump EP is stopped (t3 in FIG. 11). Accordingly, the revolution N of the mechanical pump MP is gradually increased up to the predetermined revolution N1, which suppresses rapid change in the creep force of the vehicle, etc., due to the increase in the revolution N of the mechanical pump MP, thereby preventing the driver experiencing feelings of discomfort.

When the driver releases the depression of the brake pedal, etc. in this state (t4 in FIG. 11), for example, the vehicle is accelerated, and the vehicle is started by the power from the rotating electrical machine 12. Subsequently, the engine is started (t5 in FIG. 11).

With such an arrangement, when the lockup clutch 19 is engaged, the lockup clutch 19 is disengaged due to the output from the control unit 21 to the lockup control valve CV, before or at approximately the same time as the revolution N of the mechanical pump MP starts to increase.

In the first control mode as described above, if determination has been made that the state of the electric pump EP is "LEV1," the electric pump EP is stopped. Accordingly, such an arrangement allows the electric pump EP to be stopped before the mode transits to "LEV2." Thus, such an arrangement suppresses occurrence of overload in the electric pump EP and the electric motor 20, the driver 28, a battery which serves as a capacitor device, etc., connected to the electric pump EP, thereby preventing failure of these devices.

As shown in FIG. 9, when the mode transits to the second control mode, the control unit 21 outputs an instruction to the driver 28 so as to immediately stop the electric pump EP (Step #40). When the electric pump EP is stopped, the control unit 21 outputs an instruction to the controller 27 so as to rotate the rotating electrical machine 12 at a predetermined revolution, and to start to increase the revolution N of the mechanical pump MP (Step #41). Next, determination is made whether or not the revolution N of the mechanical pump MP has increased up to the predetermined revolution N1 or more (Step #42). If determination is made that the revolution N of the mechanical pump MP has increased up to the predetermined revolution N or more ("YES" in Step #42), the revolution N of the mechanical pump MP is maintained (Step #43).

As shown in FIG. 12, when the driver decelerates or stops the vehicle by depressing the brake pedal or the like, for example, the revolution N of the mechanical pump MP is reduced. If the revolution N of the mechanical pump MP becomes smaller than the predetermined revolution N1 (t1 in FIG. 12), the electric pump EP is driven. If determination has been made that the state of the mechanical pump EP is "LEV2" in the state in which the electric pump EP is being driven (t2 in FIG. 12), the electric pump EP is immediately stopped. When the electric pump EP is stopped, the revolution N of the mechanical pump MP is gradually increased in the form of a smooth curve, whereby the revolution N of the mechanical pump MP is increased to the predetermined revolution N or more (t3 in FIG. 12). With such an arrangement as described above, the revolution N of the mechanical pump MP is gradually increased to the predetermined revolution N1, which suppresses rapid change in the creep force of the vehicle etc., due to the increase in the revolution N of the mechanical pump MP, thereby suppressing the driver experiencing feelings of discomfort.

When the driver releases the depression of the brake pedal or the like, for example, (t4 in FIG. 12), the vehicle is accelerated, whereupon the vehicle is started by the power of the rotating electrical machine 12. Subsequently, the engine is started (t5 in FIG. 12).

With such an arrangement, when the lockup clutch 19 is engaged, the control unit 21 outputs an instruction to the lockup control valve CV such that the lockup clutch 19 is disengaged before or at approximately the same time as the revolution N of the mechanical pump MP starts to increase after the electric pump EP is stopped, which is not shown.

In the second control mode as described above, with such an arrangement, if determination has been made that the state of the electric pump EP is "LEV2," the electric pump EP is immediately stopped. Such an arrangement suppresses to a short time the duration of the overload state in which overload occurs in the electric pump EP or the electric motor 20, the driver 28, a battery which serves as a capacitor device, etc., connected to the electric pump EP. This prevents failure and deterioration of these devices over time.

Other Embodiments (1) Description has been made in the aforementioned embodiment regarding an arrangement in which the revolution N of the mechanical pump MP is gradually increased in the form of a smooth curve. Also, an arrangement may be made in which the revolution N of the mechanical pump MP is increased to the predetermined revolution N1 in the form of a straight line or a curve as shown in FIGS. 13A-13D. FIGS. 13A-13D and diagrams which show the driving state of the mechanical pump MP according to the different embodiments. The different embodiments are generally the same as the aforementioned embodiment, except for the differences shown in FIGS. 13A-13D.

As shown in FIG. 13A, the revolution N of the mechanical pump MP may be gradually increased to the predetermined revolution N1 in the form of a straight line. Such an arrangement allows the revolution N of the mechanical pump MP to be increased at a constant rate.

As shown in FIG. 13B, an arrangement may be made in which the revolution N is gradually increased to the predetermined revolution N1 of the mechanical pump MP in the form of a smooth curve at a smaller rate of variability than that of the aforementioned embodiment. Such an arrangement further suppresses rapid change in the creep force of the vehicle, etc., that arises due to an increase in the revolution N of the mechanical pump MP, thereby further suppressing the driver experiencing feelings of discomfort. Also, as shown in FIG. 13C, an arrangement may be made in which the revolution N of the mechanical pump MP is increased in the form of a curve at a greater rate of variability than that of the aforementioned former embodiment, involving the target revolution being overshot. Such an arrangement allows the revolution N of the mechanical pump MP to be increased with improved responsiveness. Thus, such an arrangement allows the pressure of the operating oil to be supplied from the oil pressure control apparatus 2 to the speed change mechanism 15 to be increased further quickly.

Also, as shown in FIG. 13D, an arrangement may be made in which the revolution N of the mechanical pump MP is increased in a two-step manner, i.e., the revolution N is increased to a revolution N2 which is lower than the predetermined revolution N1, following which the revolution N is increased to the predetermined revolution N1. Such an arrangement further suppresses rapid change in the creep force of the vehicle, etc., that arises due to an increase in the revolution of the mechanical pump MP, thereby further suppressing the driver experiencing feelings of discomfort. Also, an arrangement may be made in which three or more multiple revolutions are set, and the revolution N of the mechanical pump MP is increased in a multi-step manner that consists of three or more steps.

(2) Description has been made in the aforementioned embodiment regarding the control unit 21 configured such that, if determination has been made that the state of the electric motor 20 is "LEV1" or "LEV2" based upon at least one of the temperature of the electric motor 20, the relation between the driving voltage of the electric motor 20 and the oil temperature, and the integral value W, the mode transits to the first control mode or the second control mode. Also, an arrangement may be made employing a method for evaluating every detection result output from multiple state detection mechanisms as shown in FIGS. 14A and 14B. FIGS. 14A and 14B show tables for describing this embodiment. Specifically, FIG. 14A is a table that shows an example of weighting values. FIG. 14B is a table that shows an example of the evaluation using the weighting values. Note that this different embodiment is generally the same as the aforementioned embodiment, except for the items shown in FIGS. 14A and 14B.

As shown in FIG. 14A, a predetermined region within the "normal" region before the "LEV1" region with respect to the temperature of the electric motor 20, the relation between the driving voltage of the electric motor 20 and the oil temperature, and the integral value W, is defined as "LEV0." With such an arrangement, a weighting value is assigned to each state ("LEV0," "LEV1," and "LEV2") of the electric pump EP with respect to each of the temperature of the electric motor 20, the relation between the driving voltage of the electric motor 20 and the oil temperature, and the integral value W. In this case, each weighting value is adjusted based upon the extent to which the factor affects the durability of the electric pump EP for each of the factors for detecting the state of the electric pump EP.

Specifically, with regard to the temperature of the electric motor 20, for example, a part of the "normal" region of the temperature of the electric motor 20 detected by the motor temperature detection sensor 25 as shown in FIG. 4, e.g., a temperature range which is equal to or greater than 120° C. and is less than 140° C., is set to "LEV0." With such an arrangement, the weighting value for the temperature of the electric motor 20 is set to "1.5" when the state is "LEV0." Furthermore, the weighting value for the temperature of the electric motor 20 is set to "3" when the state is "LEV1." Moreover, the weighting value for the temperature of the electric motor 20 is set to "5" when the state is "LEV2." For example, when the state is "LEV0," the weighting value with respect to the relation between the driving voltage of the electric motor 20 and the oil temperature is set to "0.5," and the weighting value with respect to the integral value W is set to "1," as compared with the weighting value "1.5" set for the temperature of the electric motor 20, each of which is set based upon the extent to which the factor effects the durability of the electric pump EP.

With such an arrangement, the weighting value is calculated for each of the temperature of the electric motor 20, the relation between the driving voltage of the electric motor 20 and the oil temperature, and the integral value W as shown in FIG. 14B, based upon the detection results from the motor temperature sensor 25, the motor voltage detection unit 32, the oil temperature sensor 24, the pressure sensor 23, and the motor revolution detection unit 33, with reference to the weighting values set as shown in FIG. 14A. Specifically, all the conditions, i.e., the temperature of the electric motor 20, the relation between the driving voltage of the electric motor 20 and the oil temperature, and the integral value W, match "LEV0," the calculation results of the weighting values for these conditions are "1.5,""0.5," and "1," respectively (A in FIG. 14B).

Next, as shown in FIG. 14B, the weighting values thus calculated are summed. For example, the control unit 21 is configured such that, if the sum total of the weighting values is equal to or greater than "3" ("A" in FIG. 14B), the mode transits to the first control mode. If the sum total of the weighting values is equal to or greater than "5" ("C" in FIG. 14B), the mode transits to the second control mode. It should be noted that the determination whether or not the sum total of the weighting values is equal to or greater than "3" corresponds to the determination in the aforementioned embodiment whether or not the "protection condition" is satisfied. Furthermore, the determination whether or not the sum total of the weighting values is equal to or greater than "5" corresponds to the determination in the aforementioned embodiment whether or not the "stop condition" is satisfied. In this case, none of the temperature of the electric motor 20, the relation between the driving voltage of the electric motor 20 and the oil temperature, and the integral value W independently satisfies the "LEV1" condition, even in a case in which the mode is switched to the first control mode. Also, none of the temperature of the electric motor 20, the relation between the driving voltage of the electric motor 20 and the oil temperature, and the integral value W independently satisfies the "LEV2" condition, even in a case in which the mode is switched to the second control mode.

As described above, with such an arrangement, determination is made whether or not the mode is switched to the first control mode or the second control mode based upon the weighting values. Such an arrangement allows the determination to be made whether or not the mode is to be switched to the first control mode or the second control mode based upon the overall evaluation results of the temperature of the electric motor 20, the relation between the driving voltage of the electric motor 20 and the oil temperature, and the integral value W. Such an arrangement allows the electric pump EP to be stopped in an earlier stage even if the conditions for neither "LEV1" nor "LEV2" are satisfied, thereby protecting the electric pump EP.

It should be noted that the weighting values described in this different embodiment are illustrated as an example for making the overall evaluation results based upon the detection results from the multiple state detection mechanisms. Also, different methods may be employed as long as they provide the overall evaluation results based upon the detection results from the multiple state detection mechanisms.

(3) Description has been made in the aforementioned embodiment regarding an arrangement in which, in the normal mode and the first control mode, the predetermined revolution of the mechanical pump MP when the electric pump EP is driven and the predetermined revolution of the mechanical pump MP when the electric pump EP is stopped are set to the same revolution N1. Also, these revolutions may be set to mutually different respective predetermined revolutions. Description has been made regarding an example in which, in the first control mode and the second control mode, the predetermined revolution of the mechanical pump MP when the electric pump EP is driven and the predetermined revolution to which the revolution N of the mechanical pump MP is to be increased are set to the same revolution N1. Also, these revolutions may be set to mutually different respective predetermined revolutions.

(4) Description has been made in the aforementioned embodiment regarding an arrangement in which, in the first control mode, the electric pump EP is stopped at approximately the same time as the revolution N of the mechanical pump MP is increased to the predetermined revolution N1 or more. Also, for example, the control unit 21 may be configured such that the electric pump EP is stopped immediately before the revolution N of the mechanical pump MP is increased to the predetermined revolution N1 or more. Also, for example, the control unit 21 may be configured such that the electric pump EP is stopped immediately after the revolution N of the mechanical pump MP is increased to the predetermined revolution N1 or more.

Description has been made in the aforementioned embodiment regarding an arrangement in which the control unit 21 is configured such that the increase in the revolution N of the mechanical pump MP is started at approximately the same time as determination is made that the state of the electric pump EP is "LEV1." Also, the control unit 21 may be configured such that the increase in the revolution N of the mechanical pump MT is started immediately after the determination has been made that the state of the electric pump EP is "LEV1," or after a predetermined period of time after the determination has been made that the state of the electric pump EP is "LEV1." Furthermore, an arrangement may be made in which, when the lockup clutch 19 is engaged, the control unit 21 outputs an instruction to the lockup control valve CV so as to disengage the lockup clutch 19 in a period of time from the point at which the determination has been made that the state of the electric pump EP is "LEV1" up to the point at which the increase in the revolution N of the mechanical pump MP is started.

Description has been made in the aforementioned embodiment regarding an arrangement in which, in the second control mode, the increase in the revolution N of the mechanical pump MP is started after the electric pump EP is stopped. Also, for example, the control unit 21 may be configured such that the increase in the revolution N of the mechanical pump MP is started at approximately the same time as the electric pump EP is stopped. Also, the control unit 21 may be configured such that the increase in the revolution N of the mechanical pump MP is started a predetermined period of time after the electric pump EP is completely stopped.

(5) Description has been made in the aforementioned embodiment regarding an arrangement employing the motor temperature sensor 25, the motor voltage detection unit 32, the oil temperature sensor 24, the pressure sensor 23, and the motor revolution detection unit 33 as the state detection mechanism for detecting the state of the electric pump EP. Also, different arrangements may be made as the state detection mechanism. For example, the state detection mechanism may be provided to the electric pump itself, or devices other than the electric motor 20 (e.g., the driver 28, battery, or the like) connected to the electric pump EP. Also, the state detection mechanism may be configured such that the state of the electric pump EP is detected by detecting the state of the electric pump itself, or devices other than the electric motor 20 (e.g., the driver 28, battery, or the like) connected to the electric pump EP.

(6) Description has been made in the aforementioned embodiment regarding an arrangement in which the driving force transmission mechanism is configured in the form of the transmission mechanism 15. Also, the driving force transmission mechanism may have different configurations. For example, the driving force transmission mechanism may have a configuration including engagement elements, gear mechanisms, etc., which allow the connection relations to be switched between an engine, at least one rotating electrical machine, and the input member 4.

Description has been made in the aforementioned embodiment regarding an arrangement in which the vehicle control apparatus according to the present invention is applied to a hybrid vehicle. However, the vehicle control apparatus according to the present invention is not restricted to such an arrangement. Rather, the vehicle control apparatus according to the present invention may be applied to vehicles other than hybrid vehicles, e.g., electric vehicles that use a rotating electrical machine alone as their driving source, vehicles that use an engine alone as their driving source, etc.

According to an exemplary aspect of the invention, if, based upon the detection results from the state detection mechanism, determination has been made that a predetermined protection condition has been satisfied, the revolution of the mechanical pump is increased to the operation threshold or more, which increases the flow of the operating oil supplied from the mechanical pump, thereby supplying an increased amount of the operating oil to the oil pressure control apparatus. This increases the pressure of the operating oil to be supplied from the oil pressure control apparatus to the driving force transmission mechanism, thereby preventing insufficient operating oil pressure being supplied to the driving force transmission mechanism. Furthermore, with such an arrangement, the electric pump is stopped after the rotational speed of the mechanical pump is increased to the operation threshold or more. Such an arrangement allows the operating oil to be appropriately supplied to the oil pressure control apparatus from the mechanical pump and the electric pump without involving temporary reduction in the oil pressure. Thus, such an arrangement allows the oil pressure control apparatus to smoothly operate the driving force transmission mechanism, thereby preventing malfunctions in the operation of the driving force transmission mechanism such as operation delay, operation shock, etc.

Thus, such an arrangement smoothly operates the driving force transmission mechanism, thereby operating the driving force transmission mechanism without involving the driver experiencing feelings of discomfort, and also thereby preventing the driving force transmission mechanism from being damaged.

With the aforementioned arrangement, if, based upon the detection results from the state detection mechanism, determination has been made that the predetermined protection condition has been satisfied, the revolution of the mechanical pump is increased to the operation threshold or more. Thus, such an arrangement allows the flow of the operation oil supplied to the oil pressure control apparatus to be increased in an early stage by increasing the revolution of the mechanical pump before the subsequent vehicle operations such as a restarting operation, an acceleration operation, etc., thereby allowing the pressure of the operation oil supplied from the oil pressure control apparatus to the driving force transmission mechanism to be immediately increased. Thus, such an arrangement allows the oil pressure control apparatus to immediately operate the driving force transmission mechanism in vehicle operations such as a start operation, an acceleration operation, etc.

Furthermore, with such an arrangement described above, if, based upon the detection results from the state detection mechanism, determination has been made that the predetermined protection condition has been satisfied, the operation of the electric pump is stopped. Thus, such an arrangement is capable of stopping the electric pump in an early stage before the state in which the durability of the electric pump can be irreversibly degraded, for example, thereby protecting the electric pump. Thus, such an arrangement prevents the electric pump itself and the devices connected to the electric pump from being damaged, thereby achieving a long operating life with respect to each of the electric pump itself and the devices connected to the electric pump.

According to another exemplary aspect of the invention, if the factor that affects the durability of the electric pump enters the predetermined safe region, which is a region before a state in which the durability of the electric pump can be irreversibly degraded, the revolution of the mechanical pump is increased to the operation threshold or more, following which the operation of the electric pump is stopped. Thus, the predetermined protection condition is specified in a range of a predetermined safe region, which is a region before a state in which the durability of the electric pump can be irreversibly degraded. Thus, such an arrangement defines the timing at which the electric pump is to be stopped after the revolution of the mechanical pump is increased to the operation threshold or more.

According to another exemplary aspect of the invention, if, based upon the detection results from the state detection mechanism, determination has been made that the electric pump has entered the state in which the durability of the electric pump can be irreversibly degraded, the operation of the electric pump is immediately stopped. Thus, such an arrangement prevents the electric pump from operating in the state in which the durability of the electric pump can be irreversibly degraded. Thus, such an arrangement is capable of protecting the electric pump itself and the devices connected to the electric pump by stopping the electric pump and the devices in an early stage, thereby preventing failure and deterioration of the electric pump itself and the devices connected to the electric pump over time.

According to another exemplary aspect of the invention, if the malfunction detection unit has detected a malfunction of the pressure adjustment valve, the operation of the electric pump is immediately stopped. Thus, such an arrangement prevents overload of the electric pump and the devices connected to the electric pump even if the pressure is increased on the outlet side of the electric pump due to a deviation in the pressure of the operating oil supplied from the mechanical pump and the electric pump that has resulted from a malfunction of the pressure adjustment valve. Thus, such an arrangement is capable of protecting the electric pump and the devices connected to the electric pump if a malfunction of the pressure adjustment valve occurs, thereby preventing the electric pump and the devices connected to the electric pump from being damaged.

According to another exemplary aspect of the invention, the state of the electric pump can be detected by at least one of the temperature detection unit, the oil temperature detection unit, and the voltage detection unit. Furthermore, determination is made based upon the detection results detected by these detection units, whether or not the predetermined protection condition has been satisfied. Thus, such an arrangement precisely checks the state of the electric pump, thereby allowing the determination of whether or not the predetermined protection condition has been satisfied to be made relatively easily.

According to another exemplary aspect of the invention, determination of whether or not the predetermined protection condition has been satisfied is made based upon the detection result of whether or not the temperature of the electric motor that drives the electric pump is greater than the upper threshold. Thus, such an arrangement is capable of determining whether or not the protection condition has been satisfied, based upon the temperature of the electric motor, which has the nature of readily changing due to overloading of the electric pump, overloading of the electric motor that drives the electric pump, etc. Thus, such an arrangement precisely checks the state of the electric pump, thereby appropriately protecting the electric pump and the devices connected to the electric pump.

According to another exemplary aspect of the invention, determination is made of whether or not the predetermined protection condition has been satisfied, based upon the result of whether or not the relation between the oil temperature of the operating oil and the driving voltage of the electric motor is within a predetermined region defined by the relation between the oil temperature of the operating oil and the driving voltage of the electric motor. Thus, such an arrangement is capable of appropriately determining whether or not the predetermined protection condition has been satisfied based upon both the oil temperature of the operating oil and the driving voltage of the electric motor. Thus, such an arrangement precisely checks the state of the electric pump, thereby appropriately protecting the electric pump and the devices connected to the electric pump.

According to another exemplary aspect of the invention, determination is made of whether or not the predetermined protection condition has been satisfied, based upon the detection result of whether or not the load state of the electric pump, obtained based upon the pressure of the operating oil and the rotational speed of the electric pump, is greater than the upper threshold. Thus, such an arrangement is capable of appropriately determining whether or not the predetermined protection condition has been satisfied based upon both the pressure of the operating oil and the rotational speed of the electric pump. Thus, such an arrangement precisely checks the state of the electric pump, thereby appropriately protecting the electric pump and the devices connected to the electric pump.

According to another exemplary aspect of the invention, before the start of an increase in the rotational speed of the mechanical pump, the lockup clutch of the fluid joint is disengaged, which releases the direct connection between the input member and the driving force transmission mechanism, thereby switching states to the state in which the power is transmitted via fluid. As a result, such an arrangement suppresses rapid change in the vehicle operation due to the increase in the rotational speed of the mechanical pump. Thus, for example, such an arrangement suppresses unintended starts when the vehicle is stationary, and suppresses unintended acceleration of the vehicle when the vehicle is being driven at a low speed.

It should be noted that the term "rotating electrical machine" used in this specification represents a motor (electric motor), a generator (electricity generating device), and a motor-generator that provides both the functions of the motor and generator.

According to another exemplary aspect of the invention, a rotating electrical machine is connected to the input member, which allows the vehicle to be started by the rotational driving force of the rotating electrical machine. In vehicles such as hybrid vehicles, electric vehicles, etc., in which the electric pump operates with relatively high frequency, such an arrangement prevents the operating oil to be supplied to the driving force transmission mechanism from being under insufficient pressure, while improving the starting/acceleration performance of the vehicle, thereby providing smooth operation of the driving force transmission mechanism. Thus, such an arrangement protects the electric pump and the devices connected to the electric pump.

According to another exemplary aspect of the invention in a vehicle having a multi-stage transmission mechanism in which the engagement element is switched with relatively high frequency between engagement and disengagement, such an arrangement described above allows the engagement element of the multi-stage transmission mechanism to be smoothly switched between engagement and disengagement using the oil pressure from the oil pressure control apparatus. Thus, such an arrangement prevents engagement malfunctions such as a delay in the engagement, engagement shock, thereby allowing the multi-stage transmission mechanism to be smoothly switched between engagement and disengagement.

According to another exemplary aspect of the invention, when the engine is connected to the input member via the transmission clutch, the rotational driving force is transmitted to the input member from the engine, whereupon the vehicle can be driven by the rotational driving force from the engine. On the other hand, when the connection between the engine and the input member is released via the transmission clutch, the transmission of the rotational driving force from the engine to the input member is blocked, whereupon the vehicle cannot be driven by the rotational driving force from the engine. Thus, such an arrangement allows the vehicle to be switched between the driving state and the stationary state by switching the transmission of the rotational driving force from the engine to the input member by the transmission clutch between engagement and disengagement.

What is claimed is:

1. A vehicle control apparatus comprising:
   an input member;
   a driving force transmission mechanism that transmits a rotational driving force of the input member to an output member;
   a mechanical pump that operates by using the rotational driving force of the input member;
   an electric pump that operates when a rotational speed of the mechanical pump is less than a predetermined operation threshold;
   an oil pressure control apparatus that performs control operations for the driving force transmission mechanism by supplying operating oil, which is supplied from the mechanical pump and the electric pump, to the driving force transmission mechanism; and
   a controller that detects a state of the electric pump,
   wherein, if the controller determines that a predetermined protection condition, which has been defined with respect to a factor that affects durability of the electric pump, has been satisfied during an operation of the electric pump, the rotational speed of the mechanical pump is increased to the operation threshold or more and the operation of the electric pump is sequentially stopped.

2. The vehicle control apparatus according to claim 1, wherein the protection condition defines a predetermined safe region with respect to the factor that affects the durability of the electric pump, which is a region before a state in which the durability of the electric pump can be irreversibly degraded.

3. The vehicle control apparatus according to claim 1, wherein:
a predetermined stop condition is employed with respect to the factor that affects the durability of the electric pump, which defines a state in which the durability of the electric pump can be irreversibly degraded; and
if the controller determines that the stop condition has been satisfied during the operation of the electric pump, the operation of the electric pump is immediately stopped.

4. The vehicle control apparatus according to claim 1, further comprising:
a pressure adjustment valve that adjusts a pressure of the operating oil supplied from the mechanical pump and the electric pump, wherein:
the controller detects malfunctions of the pressure adjustment valve, and
if the controller detects a malfunction of the pressure adjustment valve during the operation of the electric pump, the operation of the electric pump is immediately stopped.

5. The vehicle control apparatus according to claim 1, wherein the controller determines at least one of a temperature of an electric motor that drives the electric pump, an oil temperature of the operating oil, and a driving voltage of the electric motor that drives the electric pump for the state of the electric pump.

6. The vehicle control apparatus according to claim 1, wherein:
the factor that affects the durability of the electric pump includes a temperature of the electric motor that drives the electric pump, and
the protection condition defines an upper threshold of the temperature of the electric motor.

7. The vehicle control apparatus according to claim 1, wherein:
the factor that affects the durability of the electric pump includes an oil temperature of the operating oil and a driving voltage of the electric pump that drives the electric pump, and
the protection condition defines a predetermined region determined by a relation between the oil temperature of the operating oil and the driving voltage of the electric motor.

8. The vehicle control apparatus according to claim 1, wherein:
the factor that affects the durability of the electric pump includes a load state of the electric pump obtained based upon the pressure of the operating oil supplied from the mechanical pump and the electric pump and a rotational speed of the electric pump, and
the protection condition defines an upper threshold of a load state of the electric pump.

9. The vehicle control apparatus according to claim 1, wherein:
a fluid joint including a lockup clutch is provided between the input member and the driving force transmission mechanism, and
before the increase in the rotational speed of the mechanical pump is started, the lockup clutch is disengaged.

10. The vehicle control apparatus according to claim 9, further comprising:
a rotating electrical machine connected to the input member, wherein:
a vehicle is started by a rotational driving force of the rotating electrical machine in a state in which the lockup clutch is engaged by using an oil pressure of the operating oil supplied from the electric pump.

11. The vehicle control apparatus according to claim 1, wherein:
the driving force transmission mechanism is a multi-stage automatic transmission mechanism including at least one engagement element that allows a speed stage to be switched among multiple speed stages, and
the oil pressure control apparatus allows the engagement element to be switched between engagement and disengagement by using the operating oil.

12. The vehicle control apparatus according to claim 1, wherein the input member is selectively connected to an engine via a transmission clutch.

13. The vehicle control apparatus according to claim 2, wherein:
a predetermined stop condition is employed with respect to the factor that affects the durability of the electric pump, which defines the state in which the durability of the electric pump can be irreversibly degraded; and
if the controller determines that the stop condition has been satisfied during the operation of the electric pump, the operation of the electric pump is immediately stopped.

14. The vehicle control apparatus according to claim 13, further comprising:
a pressure adjustment valve that adjusts a pressure of the operating oil supplied from the mechanical pump and the electric pump, wherein:
the controller detects malfunctions of the pressure adjustment valve, and
if the controller detects a malfunction of the pressure adjustment valve during the operation of the electric pump, the operation of the electric pump is immediately stopped.

15. The vehicle control apparatus according to claim 13, wherein the controller determines at least one of the temperature of an electric motor that drives the electric pump, the oil temperature of the operating oil, and the driving voltage of the electric motor that drives the electric pump for the state of the electric pump.

16. The vehicle control apparatus according to claim 13, wherein:
the factor that affects the durability of the electric pump includes a temperature of the electric motor that drives the electric pump, and
the protection condition defines an upper threshold of the temperature of the electric motor.

17. The vehicle control apparatus according to claim 13, wherein:
the factor that affects the durability of the electric pump includes an oil temperature of the operating oil and a driving voltage of the electric pump that drives the electric pump, and
the protection condition defines a predetermined region determined by a relation between the oil temperature of the operating oil and the driving voltage of the electric motor.

18. The vehicle control apparatus according to claim 13, wherein:
the factor that affects the durability of the electric pump includes a load state of the electric pump obtained based upon the pressure of the operating oil supplied from the mechanical pump and the electric pump and a rotational speed of the electric pump, and
the protection condition defines an upper threshold of a load state of the electric pump.

19. The vehicle control apparatus according to claim 13, wherein:
- a fluid joint including a lockup clutch is provided between the input member and the driving force transmission mechanism, and
- before the increase in the rotational speed of the mechanical pump is started, the lockup clutch is disengaged.

20. The vehicle control apparatus according to claim 19, further comprising:
- a rotating electrical machine connected to the input member, wherein:
- a vehicle is started by a rotational driving force of the rotating electrical machine in a state in which the lockup clutch is engaged by using an oil pressure of the operating oil supplied from the electric pump.

21. The vehicle control apparatus according to claim 13, wherein:
- the driving force transmission mechanism is a multi-stage automatic transmission mechanism including at least one engagement element that allows a speed stage to be switched among multiple speed stages, and
- the oil pressure control apparatus allows the engagement element to be switched between engagement and disengagement by means of the operating oil.

22. The vehicle control apparatus according to claim 13, wherein the input member is selectively connected to an engine via a transmission clutch.

* * * * *